Dec. 6, 1927.

F. C. HERSMAN 1,651,390

DUST SEED TREATMENT MACHINE

Filed April 16, 1927   2 Sheets-Sheet 1

INVENTOR.
FRANCIS C. HERSMAN
BY Langdon Moore
ATTORNEYS.

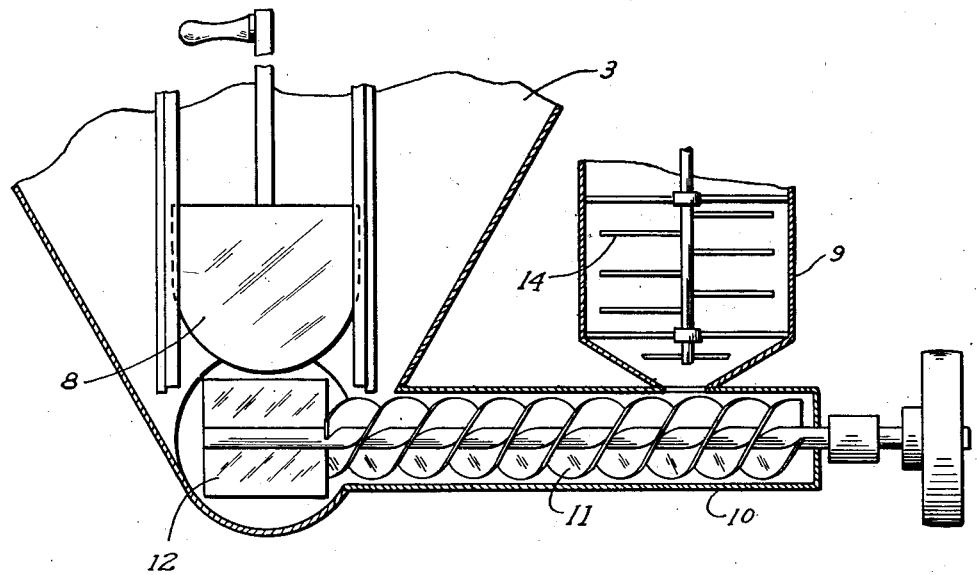
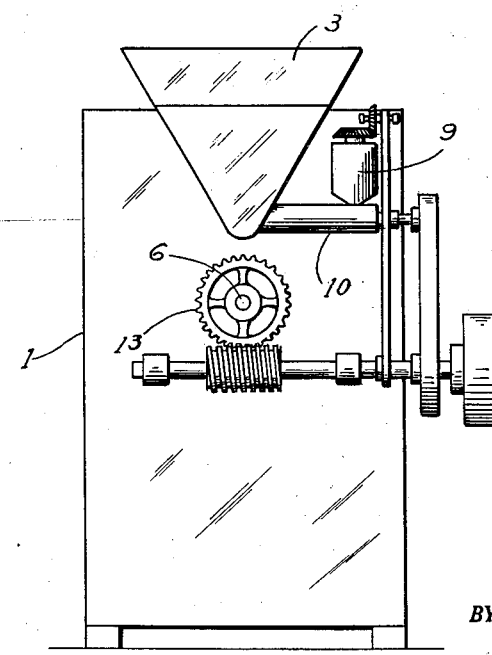

Patented Dec. 6, 1927.

1,651,390

UNITED STATES PATENT OFFICE.

FRANCIS C. HERSMAN, OF NORMAL, ILLINOIS.

DUST-SEED-TREATMENT MACHINE.

Application filed April 16, 1927. Serial No. 184,200.

This invention relates to improvements in treating, protecting, or conditioning seeds before planting and more particularly to a dust-seed treatment machine.

The seeds of cereals such as corn, wheat, barley or rye, as well as peas, beans and the like are subject to various diseases or fungus growths during storage or when planted in earth containing such bacteria. For some time such seeds have been treated with a liquid and more recently with a powder which will adhere and form a preservative coating about each particle and render the seed or grain impervious to attack by such parasites, fungus or bacteria.

It is the object of this invention to provide a machine for more readily or quickly treating seeds or particles of grain with such a powder which is continuous in i's operation, positive in the application of the powder to each particle, prevents the powder permeating the atmosphere surrounding the machine, and conserves the surplus of powder from one cycle of operation by delivering it to the passage where the particles are entering the machine.

With these and other objects in view reference is made to the accompanying drawings which illustrate a preferred embodiment of this invention, yet it is to be understood that minor detail changes may be made thereto without departing from the scope thereof.

In the drawings:

Figure 3 is an enlarged detail view illustrating in vertical section the powder or dust feeding means, and first step of mixing it with the seeds or particles of grain.

Figure 4 is a view in end elevation illustrating the receiving hopper.

Figure 1:
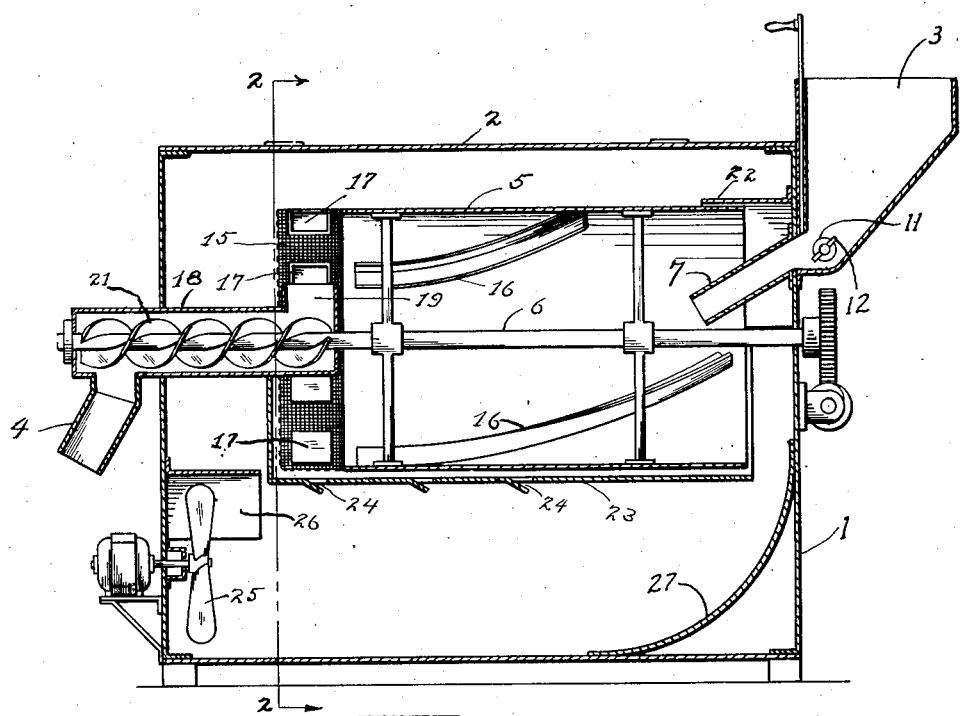
Figure 1 is a view in vertical section taken through the longitudinal center line of this improved machine.
Figure 2:
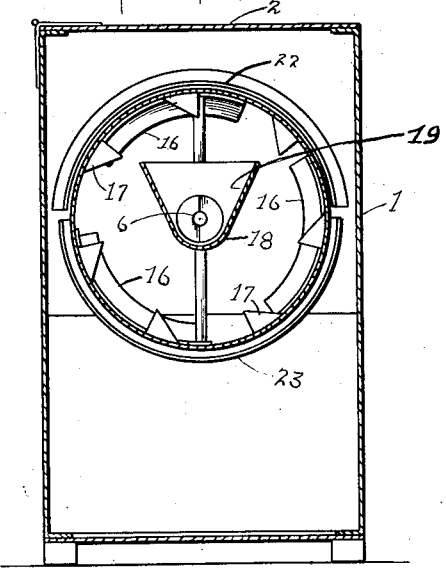
Figure 2 is a view in transverse section taken on the line 2—2 of Figure 1.

As illustrated, the machine is completely enclosed in a casing 1, preferably of metal, and having a hinged top 2 for inspection of the working parts which is provided with a dust-tight closure. The seeds or particles of grain are fed into a hopper 3 at one end of the casing together with the protecting powder and the treated particles are discharged at the other end through a discharge spout 4 adapted to receive the necks of seed bags. The machine includes a cylindrical casing 5 centrally mounted upon the rotatable shaft 6 passing through the ends of the casing. The receiving end of the casing is provided with a delivery spout 7 on the interior entering into the open end of the cylinder 5 at one end and into an exteriorly mounted receiving hopper 3 at the other end. This opening is preferably provided with a gate valve 8 to regulate the rate of seed or grain delivery into the cylinder. At one side of the receiving hopper a powder receptacle 9 is mounted upon the exterior of the casing, the bottom of which opens into a sleeve 10 surrounding a rotatable screw or auger conveyor 11 which is adapted to deliver the preservative powder from its container to the bottom of the receiving hopper at the entrance to the delivery spout. The shaft of this conveyer is extended beyond its sleeve and is provided with a paddle or agitator 12 adapted to rotate opposite the receiving opening. This end of the cylinder shaft 6 is provided with a driving wheel 13 to which power may be transmitted by a train of gears, belts, or other desired means from a source of power. The shaft of the powder conveyor 11 is in a like manner connected to the source of power, as well as an agitator 14 within the powder receptacle. It is preferred to arrange this driving mechanism in such a manner that the speeds of operation of both shafts may be regulated as desired for use with different types of grain or seed.

The rotatable cylinder 5 may be termed a "mixing cylinder". It is preferred to provide this cylinder with solid walls adjacent the receiving end and with a screened or perforated portion 15 adjacent the discharge end, for a purpose hereinafter described.

On the interior of the solid portion carrying and advancing members 16 are provided in the form of inwardly extending ribs or blades, preferably three in number, arranged at an angle to the longitudinal dimension of the cylinder. About the screened or perforated end 15 and secured to the interior thereof, conveyer buckets 17, preferably seven in number, are arranged. The end of the screened or perforated portion of the cylinder is preferably closed by a screen of such mesh to retain the seeds or particles of grain therein but allow a current of air to pass therethrough. A discharge sleeve in the form of a cylindrical casing 18 entering the discharge end of the casing 1 with its exterior end closed, forms a bearing for that end of the mixing cylinder shaft 6. The sleeve is concentric with said shaft and terminates at its inner end in a hopper 19 opening upwardly in line with the conveyer buckets 17. The underside of the sleeve on the exterior of the casing is provided with a discharge spout 4 about which the open ends of seed bags may be attached. The cylinder shaft within the discharge sleeve is provided with a screw or auger conveyer 21 having close contact with the inner walls thereof, as shown.

The receiving end of the mixing cylinder 5 is arranged at a distance from that end of the casing and a semicircular plate 22 is mounted on the casing and which extends over and beyond the upper half of the cylinder. Likewise a semi-circular plate 23 is secured to the opposite side walls of the casing which extends throughout the entire length on the underside of the cylinder, the lowermost portions of which plate are provided with openings 24 formed by striking down a portion of the bottom from the direction of the receiving end of the casing. As shown in the drawing, the cylinder 5 is mounted with suitable clearance between it and the bottom of the casing. A fan blower 25 is mounted centrally of the discharge end of the casing within this space and is preferably provided with a semi-circular plate 26 extending about the upper side thereof from the adjacent end of the casing. The opposite end of the casing between the end wall and bottom is provided with an upwardly curved deflector 27 preferably extending above the lower surface of the mixing cylinder. This fan blower may be motor-driven, as shown, or connected in any desired manner to the source of power employed for driving the mixing cylinder shaft.

The operation is as follows:

The gate valve 8 in the receiving hopper 3 is properly adjusted, the speeds of the powder delivery conveyer 11 and mixing cylinder shaft 6 are adjusted to the proper relation, the preservative powder such as copper carbonate, or other preservative powders, is placed in the powder receptacle 9 and the seeds or grain desired to be treated supplied to the receiving hopper, and the driving mechanism for the mixing cylinder, powder conveyor and fan blower is started in operation. The preservative powder is delivered from the powder container to the bottom of the receiving hopper and the rotation of paddle or agitator 12 in the entrance to the discharge spout mixes the incoming particles of grain or seed with the incoming preservative powder. After this initial mixing both powder and seed or grain pass through the delivery spout 7 into the adjacent end of the mixing cylinder 5 where they fall upon the bottom thereof and by the rotary motion of the cylinder, the particles of grain or seeds are turned over and over intermingling with the powder until engaged by one of the conveying and advancing members 16 which raises the seed and powder until they fall from said member as it approaches the uppermost part of its rotation, during this upward movement by the angular arrangement of the member the seeds or grain are advanced somewhat toward the discharge end of the machine. The seeds or grain falling from this elevated position descend through a dust of powder to the bottom of the cylinder and are again rolled over and over intermingling with the powder until engaged by the next conveying and advancing member when the above said operation is repeated. This operation continues until the seeds or particles of grain reach the screened or perforated end 15 of the cylinder where the excess powder is sifted through the screen or perforations until the seeds or particles of grain are engaged by one of the conveyer buckets 17. The rotating movement of the cylinder then raises the seeds or particles of grain until they fall from the bucket into the hopper 19 of the discharge sleeve 18 and are engaged by the conveyer 21 therein which advances the seeds or particles of grain through the sleeve into the discharge spout 4 upon the exterior of the casing, where it is bagged in the usual manner. During this operation the fan blower 25 is creating a current of air through the space below the cylinder where it is deflected upward and then passes through the cylinder back to the fan. The dust or powder in excess of that which adheres to the surfaces of the seeds or particles of grain is removed by this current of air from contact therewith during the advancing movement in the rotating cylinder as the particles fall through the air from their uppermost position in the cylinder, as well as by the passage of the grain or seed over the perforated end of the cylinder. This excess dust or powder which falls through the screened or perforated portion and which may gather upon the upper surface of the curved plate 23 below the mixing cylinder is drawn by the injector action of the current of air passing below the openings 24 in the lowermost part of this plate. The curved deflector plate 27 at the receiving end of the casing deflects the current of air upward into the interior of the rotating cylinder through the agency of the semi-circular plate 22 about the upper portion of said cylinder.

By this operation it is seen that this machine will operate continuously as long as the powder container and receiving hopper remain filled. The rotating paddle or agitator at the receiving opening together with the seed or grain thereabove form a closure for this end of the casing and as the dust or powder is delivered and intimately mixed just at this opening it is carried by the incoming grain into the casing, and cannot ascend through the hopper into the atmosphere. The rotating paddle not only mixes the powder and seed or grain but also insures a constant flow of the two from the hopper. The auger or screw conveyer at the discharge end closely fitting the discharge sleeve prevents loose powder or particles of dust suspended in the air, which escape the suction action of the fan blower, from rushing therethrough into the surrounding atmosphere, it being understood that there is always a possibility of some of the dust becoming detached from contact with the particles of grain or seed after they have been discharged into the seed bag surrounding the discharge spout.

What I claim is:

1. In a seed or grain treating machine the combination with an enclosing casing, of a horizontal rotatable mixing cylinder arranged therein with an air passage between the cylinder and casing walls, with a fan blower arranged in said passage at one end for creating a continuous current of air through said passage and mixing cylinder.

2. In a seed or grain treating machine the combination with an enclosing casing, of a horizontal rotatable mixing cylinder arranged therein with an air passage between the cylinder and casing walls, with a fan blower arranged in said passage at one end for creating a continuous current of air through said passage and mixing cylinder, a hopper for receiving the articles to be treated arranged at one end having a delivery spout adapted thereto passing through the wall of the casing, a receptacle for receiving powder to be employed in the treatment secured to the said end wall, means for conveying said powder to the opening of the spout at the bottom of the hopper, and additional means for intimately mixing said powder and articles as they enter the delivery spout.

3. In a seed or grain treating machine the combination with an enclosing casing, of a horizontal rotatable mixing cylinder arranged therein with an air passage between the cylinder and casing walls, with a fan blower arranged in said passage at one end for creating a continuous current of air through said passage and mixing cylinder, a hopper for receiving the articles to be treated arranged at one end having a delivery spout adapted thereto passing through the wall of the casing, a receptacle for receiving powder to be employed in the treatment secured to the said end wall, means for conveying said powder to the opening of the spout at the bottom of the hopper, and additional means for intimately mixing said powder and articles and maintaining a constant flow of said mixture into said mixing cylinder.

4. In a seed or grain treating machine the combination with an enclosing casing, of a horizontal rotatable mixing cylinder arranged therein with an air passage between the cylinder and casing walls, with a fan blower arranged in said passage at one end for creating a continuous current of air through said passage and mixing cylinder, said mixing cylinder provided with means extending from the receiving end for mixing and advancing the seeds and powder, and provided with means adjacent the discharge end for separating the excess powder from the mixture.

5. In a seed or grain treating machine the combination with an enclosing casing, of a horizontal rotatable mixing cylinder arranged therein with an air passage between the cylinder and casing walls, with a fan blower arranged in said passage at one end for creating a continuous current of air through said passage and mixing cylinder, said mixing cylinder provided with means extending from the receiving end for mixing and advancing the seeds and powder, and provided with means adjacent the discharge end for separating the excess powder from the mixture, said means including a screening or sieve in prolongation of the cylinder walls and a plate extending below said walls above said air passage having injector openings therein, whereby the passage of the current of air carries the excess powder from the mixture and impregnates the current with said powder to be continuously passed through the mixing cylinder.

6. In a seed or grain treating machine the combination with an enclosing casing of an open horizontal mixing cylinder rotatably mounted therein, a seed or grain hopper and a preservative powder container provided with means for simultaneously delivering seeds or grain mixed with a predetermined quantity of powder within an end of the mixing cylinder, means within the mixing cylinder for engaging and carrying the powder and seeds or grain about a part revolution, dropping them, and at each engagement advancing toward the opposite end, a discharge hopper within the opposite end of the cylinder adapted to receive the dusted seeds or grain provided with means conveying such seeds therefrom and discharging them through the adjacent end of the machine casing, an air passage between the exterior walls of the mixing cylinder and interior walls of the casing, and means for creating a constant circulation of air about said passage and through the interior of the mixing cylinder.

Signed at Bloomington, Illinois, this 14 day of April, 1927.

FRANCIS C. HERSMAN.